(12) United States Patent
Campbell et al.

(10) Patent No.: US 12,025,707 B2
(45) Date of Patent: Jul. 2, 2024

(54) WALL VISUALISATION FROM VIRTUAL POINT OF VIEW

(71) Applicant: GroundProbe Pty Ltd, Windsor (AU)

(72) Inventors: Lachlan Campbell, Windsor (AU); Benny Chen, Windsor (AU)

(73) Assignee: GroundProbe Pty Ltd, Windsor (AU)

( * ) Notice: Subject to any disclaimer, the term of this patent is extended or adjusted under 35 U.S.C. 154(b) by 567 days.

(21) Appl. No.: 17/266,530

(22) PCT Filed: Aug. 7, 2019

(86) PCT No.: PCT/AU2019/050821
§ 371 (c)(1),
(2) Date: Feb. 5, 2021

(87) PCT Pub. No.: WO2020/028943
PCT Pub. Date: Feb. 13, 2020

(65) Prior Publication Data
US 2021/0318441 A1    Oct. 14, 2021

(30) Foreign Application Priority Data

Aug. 7, 2018   (AU) ................................ 2018902869

(51) Int. Cl.
*G01S 17/89*   (2020.01)
*G01S 13/89*   (2006.01)
(Continued)

(52) U.S. Cl.
CPC .............. *G01S 17/89* (2013.01); *G01S 13/89* (2013.01); *G06T 7/246* (2017.01); *G06T 7/30* (2017.01);
(Continued)

(58) Field of Classification Search
CPC ........ G01S 17/89; G01S 13/89; G01S 7/4808; G01S 13/52; G01S 17/50; G06T 7/246;
(Continued)

(56) References Cited

U.S. PATENT DOCUMENTS

| 11,619,487 B2* | 4/2023 | Lei ..................... G01S 13/9023 |
| | | 382/154 |
| 2017/0046840 A1 | 2/2017 | Chen et al. |

(Continued)

FOREIGN PATENT DOCUMENTS

| GB | 2537696 A | 10/2016 |
| WO | 2002/001570 A1 | 1/2002 |
| WO | 2002/046790 A1 | 6/2002 |
| WO | 2017/063033 A1 | 4/2017 |
| WO | 2018/138516 A1 | 8/2018 |

OTHER PUBLICATIONS

Berger et al., "A Survey of Surface Reconstruction from Point Clouds", Computer Graphics Forum, 27 pages; downloaded on Jan. 29, 2021 (https://hal.inria.fr/hal-01348404v2/document).

(Continued)

*Primary Examiner* — Bobbak Safaipour
(74) *Attorney, Agent, or Firm* — Howard & Howard Attorneys PLLC

(57) ABSTRACT

A slope monitoring system for monitoring deformation of a wall or slope from a virtual point of view. A slope monitoring device directs signals at a slope or wall and compiles direction data, range data and amplitude data from signals reflected from the slope or wall. The direction data, range data and amplitude data comes from a first real position and a second real position. The data may be recorded sequentially or concurrently.

14 Claims, 9 Drawing Sheets

(51) Int. Cl.
*G06T 7/246* (2017.01)
*G06T 7/30* (2017.01)
*G06T 19/20* (2011.01)

(52) U.S. Cl.
CPC .... *G06T 19/20* (2013.01); *G06T 2207/10028* (2013.01); *G06T 2207/10044* (2013.01); *G06T 2207/30181* (2013.01); *G06T 2210/56* (2013.01); *G06T 2219/2004* (2013.01)

(58) Field of Classification Search
CPC . G06T 7/30; G06T 19/20; G06T 2207/10028; G06T 2207/10044; G06T 2207/30181; G06T 2210/56; G06T 2219/2004; G06T 2207/30132; G06T 7/248; E21C 41/16; G06Q 50/02
See application file for complete search history.

(56) References Cited

U.S. PATENT DOCUMENTS

2021/0048294 A1* 2/2021 Lei ............... G01S 13/867
2023/0228748 A1* 7/2023 Ishii ............... G01N 33/5695
435/7.32

OTHER PUBLICATIONS

International Search Report and Written Opinion (International Application No. PCT/AU2019/050821); dated Nov. 11, 2019; 9 pages.
International Preliminary Report on Patentability (International Application No. PCT/AU2019/050821); dated Dec. 17, 2019; 6 pages.

* cited by examiner

WALL VISUALISATION FROM VIRTUAL POINT OF VIEW

FIELD OF THE INVENTION

The present invention relates to the field of mine safety. More particularly, the invention relates to a method and apparatus for monitoring a wall or slope for movement. The invention finds particular application in underground mine wall or roof monitoring using slope stability lidar.

BACKGROUND TO THE INVENTION

The Applicant has previously described a method and apparatus for monitoring slope deformation using laser ranging in International Patent Publication number WO 2017/063033, the content of which is incorporated by reference. The Applicant has also described a slope monitoring system based on radar in International Patent Publication number WO 2002/046790, the content of which is also incorporated by reference. The systems described in these international patent publications have a number of operational similarities. For instance, both systems are described as operating from a fixed point and accumulating data over time. Any movement of a monitored slope or wall is detected as a change in the range from the lidar or radar. The systems have proven to be highly reliable with sub-millimeter accuracy.

It has been recognised that any movement of the radar or lidar will disrupt the monitoring and introduce errors that reduce the monitoring accuracy. Various techniques have been developed to handle short term errors, such as atmospheric variations or ground vibrations but the existing techniques do not account for significant data discontinuities that occur if equipment is removed and then returned to approximately the same position for continued monitoring. It will be appreciated that long-term monitoring produces more reliable slope deformation maps and thus better safety outcomes but it is sometimes necessary to move equipment which disrupts the monitoring continuity. The need to move equipment may be due to mine operations, such as blasting, or it may be due to economic considerations, such as equipment shared between multiple locations.

At present the best solution for relocating monitoring equipment to a previous location is to use precision surveying techniques, but these are not able to achieve sufficient accuracy for the sub-millimetre monitoring capability of the radar and lidar equipment described in the patent applications mentioned above.

SUMMARY OF THE INVENTION

In one form, although it need not be the only or indeed the broadest form, the invention resides in a slope monitoring system that monitors deformation of a wall or slope from a virtual point of view comprising:
  a slope monitoring device that directs signals at a slope or wall and compiles a point cloud of direction data, range data and amplitude data from signals reflected from the slope or wall; and
  at least one processor that performs the steps of:
    (a) acquiring first direction data and first range data received from a first point cloud compiled by the slope monitoring device when in a first position having a first real point of view;
    (b) acquiring second direction data and second range data received from a second point cloud compiled by the slope monitoring device when in a second position having a second real point of view;
    (c) transforming the first direction data and first range data from the first real point of view and the second direction data and second range data from the second real point of view to virtual direction data and virtual range data having a virtual point of view by:
      (i) rigid registration wherein the size and shape of the point cloud and distance between points in the point cloud are preserved; or
      (ii) non-rigid registration wherein the size and shape of the point cloud and distance between points in the point cloud are not preserved;
    (d) segmenting the transformed data into blocks of data defining a voxel; and
    (e) comparing voxel range values over time to identify movement.

The slope monitoring device may be a slope stability radar or slope stability lidar as described in International Patent Publication numbers WO2002/001570 and WO2017/063033 respectively.

The direction data and range data is contained in the point cloud recorded by the slope monitoring device. A point cloud is a set of data points in space representing the measurement of an external surface of objects from a measuring device like a 3D laser scanner. Individual points are represented by a x, y, z coordinate in both local or absolute coordinate systems. The distance between each point collectively gives the shape and dimensions (size) of the point cloud. Point cloud data are conventionally used without distorting the shape or dimensions of the cloud by altering the individual x, y, z attributes of each points. However, constant translation and or rotation of all the points in the point cloud without distorting the shape and dimensions may also be used as part of the registration process.

The virtual point of view may be the first real point of view from the first position or the second real point of view from the second position.

The step of transforming the data may be implemented using permutations of rigid registration and non-rigid registration. A transform matrix acts on the translation and rotation of the real position to transform to the virtual position within the 6 DOF (degrees of freedom).

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Figure 1:
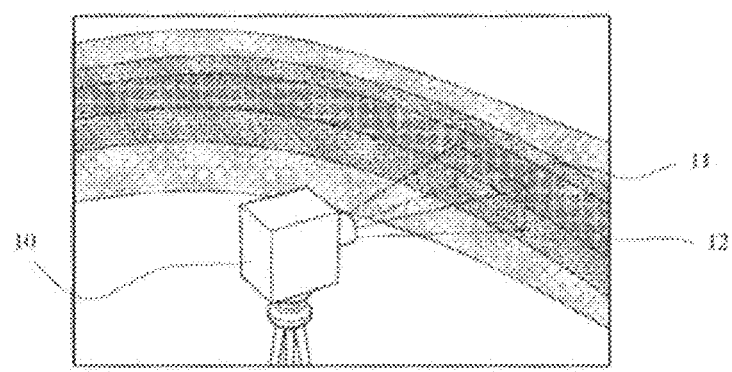
FIG. 1 is a sketch of a slope monitoring device.

Embodiments of the present invention reside primarily in a slope monitoring system comprising a slope monitoring device and a processor for transforming measured data to a virtual point of view. Accordingly, the elements of the device and the method steps of the processor have been illustrated in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

Referring to FIG. 1 there is a shown a slope monitoring device which is a Slope Stability Lidar 10 that is viewing a scene 11 that may have regions which are stable and other regions which are moving. The following description is presented as applicable to Slope Stability Lidar but the invention is also applicable to Slope Stability Radar. In the embodiment of FIG. 1 the scene 11 is part of a slope of an open cut mine 12. For this embodiment the invention is applicable to a situation where a single slope monitoring device is used to monitor multiple locations. The slope monitoring device may monitor from a location for a period of time and then be moved to another location for a period of time, before being moved back to the original location.

Figure 2:
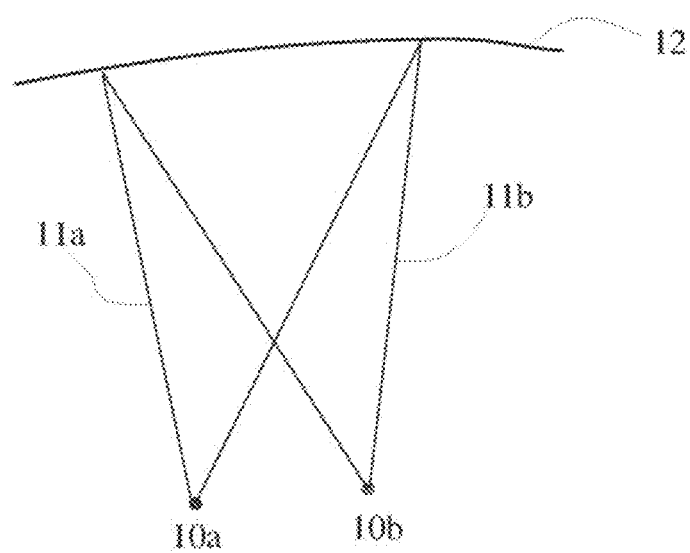
FIG. 2 demonstrates a measurement error issue.
Figure 3:
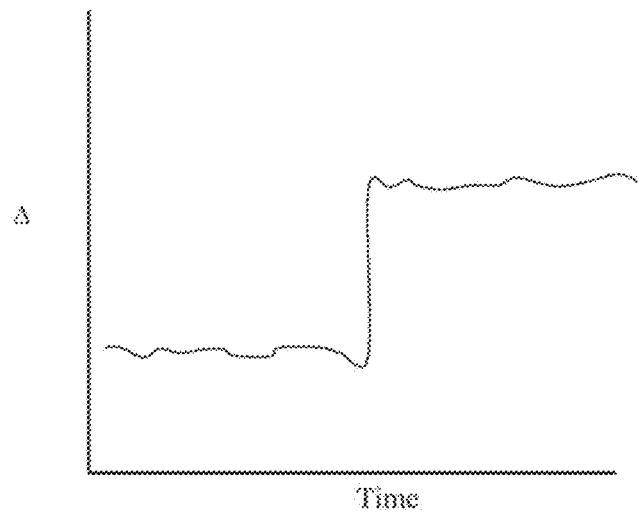
FIG. 3 shows a discontinuity in deformation data due to relocation of a slope monitoring device.

As depicted in FIG. 2, the slope monitoring device will be in a first position 10a having a first point of view 11a when initially in the original location but when moved back to the original location will have a second position 10b having a second point of view 11b. Although effort may be made to return the slope monitoring device to the same position it will almost inevitably be slightly displaced and give rise to an error as depicted in FIG. 2. Because slope monitoring occurs over long ranges compared to the accuracy of measurement, even a small displacement between first position 10a and second position 10b will mean there is a discontinuity in the deformation data, as shown in FIG. 3. In order to use all the available data for continuous slope monitoring the data is processed to remove the measurement error as described below.

FIG. 2 shows a horizontal displacement so the measurement error manifests as a parallax error. It will be appreciated that an error occurs with displacement or rotation of the slope monitoring device in any direction. The problem is therefore three-dimensional, not two-dimensional as depicted in FIG. 2. In fact, there are six degrees of freedom (6DoF: x-translation; y-translation; z-translation; pitch; yaw; roll) that can all give rise to error.

Figure 4:
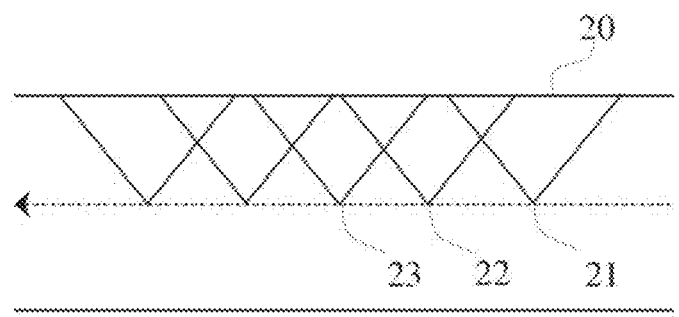
FIG. 4 is an example of the sequential relocation of the slope monitoring device of FIG. 1.

Another situation in which the data must be corrected is shown in FIG. 4. FIG. 4 represents an underground mine 20 in which a slope monitoring device is mounted on a mobile platform and conveyed through the mine. Typically this may be a lidar system mounted on a vehicle. As the lidar system traverses the mine it takes measurements of the mine wall from a number of locations such as 21, 22, 23, etc. at a subsequent time, such as for example the next day, the process is repeated. A comparison of the data collected could be used to produce a deformation map as long as the data was repeatedly taken from the same position with the same point of view, but this is not the case. As explained below, the data taken from similar points is transformed from a first position having a first real point of view and a second position having a second real point of view to a virtual point of view. Conveniently the virtual point of view can provide the user with a consistent point of view irrespective of the actual first point of view, second point of view or subsequent points of view.

For the avoidance of confusion, it should be understood that the locations 21, 22, 23 etc in FIG. 4 are not the first position and second position referred to above. For each of the locations 21, 22, 23 there will be a first position corresponding to data collected on a first day, a second position corresponding to data collected on a second day, a third position etc.

Figure 5:
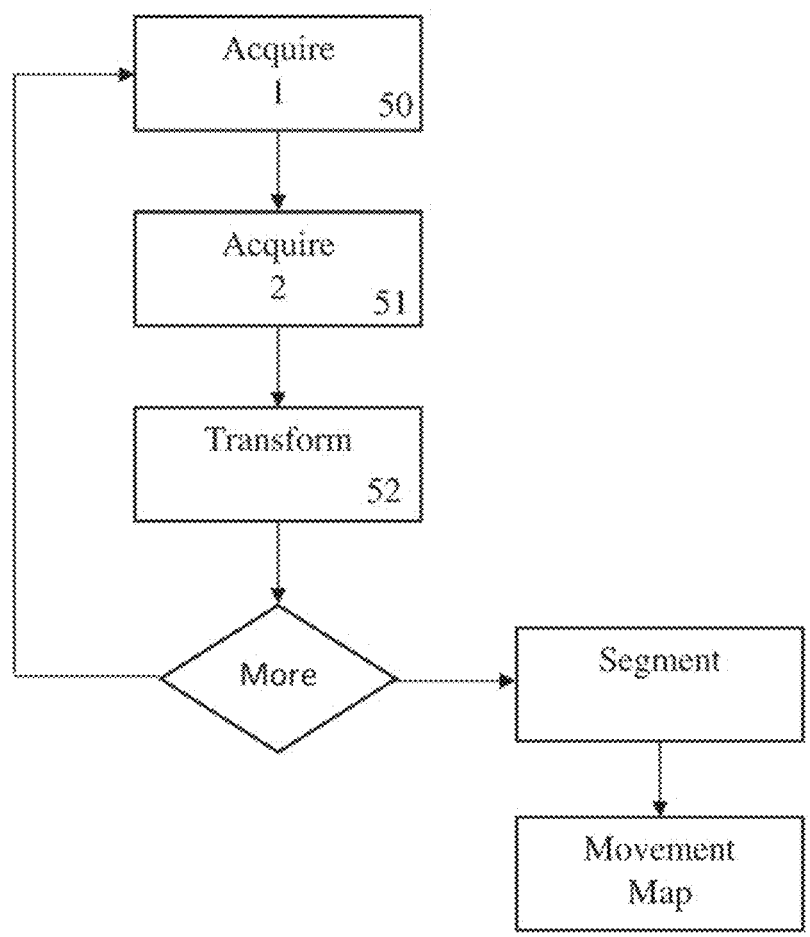
FIG. 5 is a flowchart of a process for wall visualisation from a virtual point.

One process for the data transformation is shown in FIG. 5. In a first step 50 first data is acquired from a first position with a first real point of view. In subsequent step 51 second data is acquired from a second position with a second real point of view. The first data and the second data includes at least direction data and range data. The data is transformed at step 52 to a common virtual point of view.

The process of steps 50, 51 and 52 may be repeated multiple times or may occur only once. In the first example mentioned above of monitoring an open pit the slope monitoring device may only be moved once so that the steps of acquiring data may be relatively long time periods with multiple measurements to produce deformation maps. In the second example of monitoring an underground mine each acquisition period is short and the steps are repeated multiple times to build a deformation map.

Once the data is aggregated the direction data and range data is segmented to form voxels. The range data for each voxel is averaged and compared to previous averaged range data from which a deformation map is produced and displayed. One approach to this step is described in International Patent Publication number WO 2017/063033, the content of which is incorporated by reference.

Figure 6:
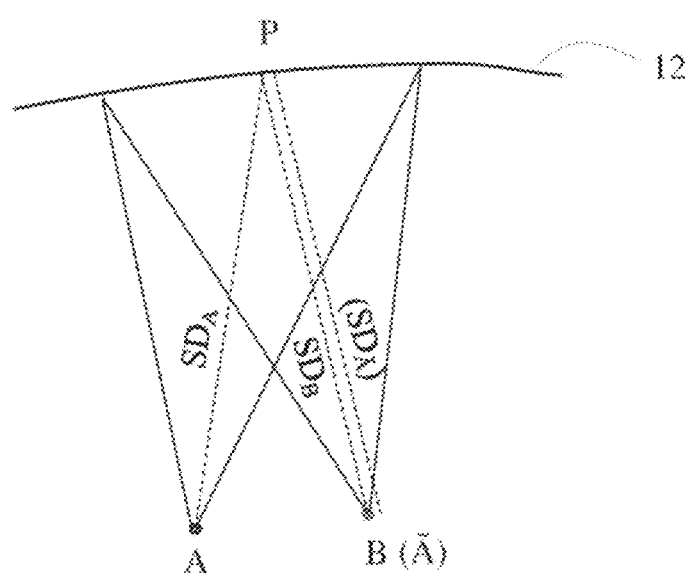
FIG. 6 depicts transformation to a virtual point of view.

The process of the transformation can best be explained by reference to FIG. 6. Let $[A_p, B_p]$ be two point sets of point P from location A point of view and location B point of view respectively. The objective is to derive a virtual point transformation matrix to transform Ap such that the distance between Ap and Bp on all axes is minimised, hence creating a virtual point $\tilde{A}_p$. This can be achieved by various image processing techniques such as rigid registration or non-rigid registration.

So, let T be the transform model $$T(A_p) = B_p \cdot E_{rr}$$

Where $E_{rr}$ is the error function. So referring to FIG. 6, SDA is the slope distance from point A to P and SDA is the transformed slope distanced from the new virtual point A to point P.

$$SD_{\tilde{A}} = SD_B \cdot \text{Err}$$

$$\tilde{A} = B \cdot \text{Err}$$

$$\tilde{A}_p = B_p \cdot \text{Err}$$

The distance Err can be derived using standard Euclidean distance for each pair of points or any other distance function. For example:

$$\text{Dist}(T(Ap)(Bp)) = \sum_{a \in T(Ap)} \sum_{b \in Bp} (a-b)^2$$

Subsequent point clouds captured from the $N^{th}$ different location [$N_p$] can then be transformed to the nominated virtual point. Therefore, in this example:

$$T(N_p) = B_p \cdot E_{rr}$$

$$SD_{\tilde{N}} = SD_B \cdot \text{Err}$$

$$\tilde{N} = B \cdot \text{Err}$$

$$N_p = B_p \cdot \text{Err}$$

Figure 7:
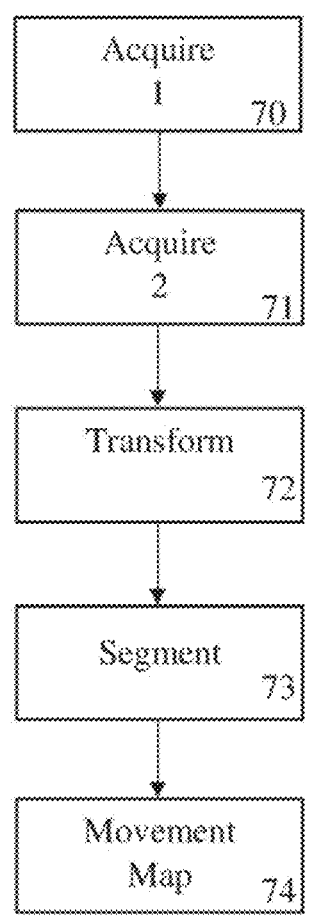
FIG. 7 is a flowchart of an alternate process for wall visualisation from a virtual point.

An alternate approach to the process of wall visualization is depicted in FIG. 7. In a first step 70 first data is acquired from a first position with a first real point of view. The first data includes at least direction data and range data. In a subsequent step 71 second data is acquired from a second position with a second real point of view. The second data includes at least direction data and range data. The data is transformed at step 72 to virtual data as from a common virtual point of view. The virtual data includes at least virtual direction data and virtual range data which is transformed to be data that has apparently been recorded at the virtual point of view. The virtual direction data and virtual range data is segmented to form voxels in step 73. The change in direction and range of the voxels is used to produce a deformation map 74.

Figure 8:
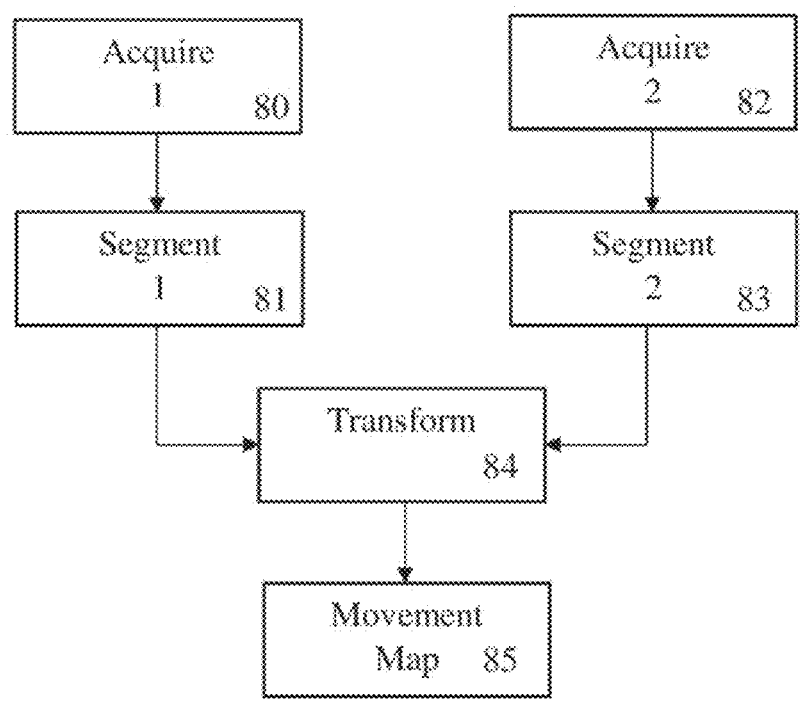
FIG. 8 is a flowchart of a further alternate process for wall visualisation from a virtual point.

A further alternate processing approach is depicted in FIG. 8. The process of FIG. 8 may be applicable if two slope monitoring devices have overlapping fields of view. That is to say, they both monitor the same section of slope or wall. Because each slope monitoring device is monitoring from a different point of view the data is not considered to be able to be combined. However, by using the process depicted in FIG. 8 a single deformation map of the overlapping area can be produced from the data from both slope monitoring devices. In a first step 80 first data is acquired from a first position with a first real point of view. The first data includes at least direction data and range data. The direction data and range data is segmented to form voxels in step 81. In a simultaneous step 82 second data is acquired from a second position with a second real point of view. The second data includes at least direction data and range data. The direction data and range data is segmented to form voxels in step 83. The data is transformed at step 84 to a common virtual point of view from which a deformation map 85 is produced and displayed.

Figure 9:
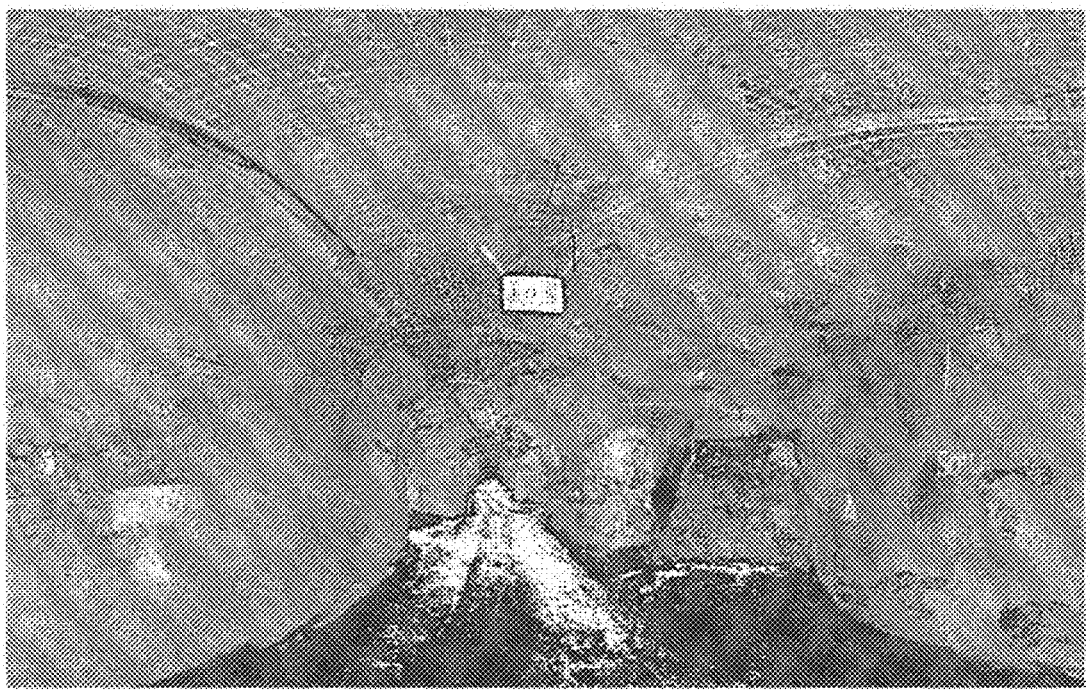
FIG. 9 is a point cloud image of an extraction drive in an underground mine.

FIG. 9 is a point cloud image of an extraction drive in an underground mine taken using a GML Lidar from a first real point of view. The image shows a tunnel going straight ahead and a draw point to the half right. The areas of interest for the users is the walls, the backs (roof) and the pillars. This scene represents a typical underground mine environment. This data is a non-voxelised raw data from the Lidar. The anomaly in the centre of the image is a sign.

Figure 10:
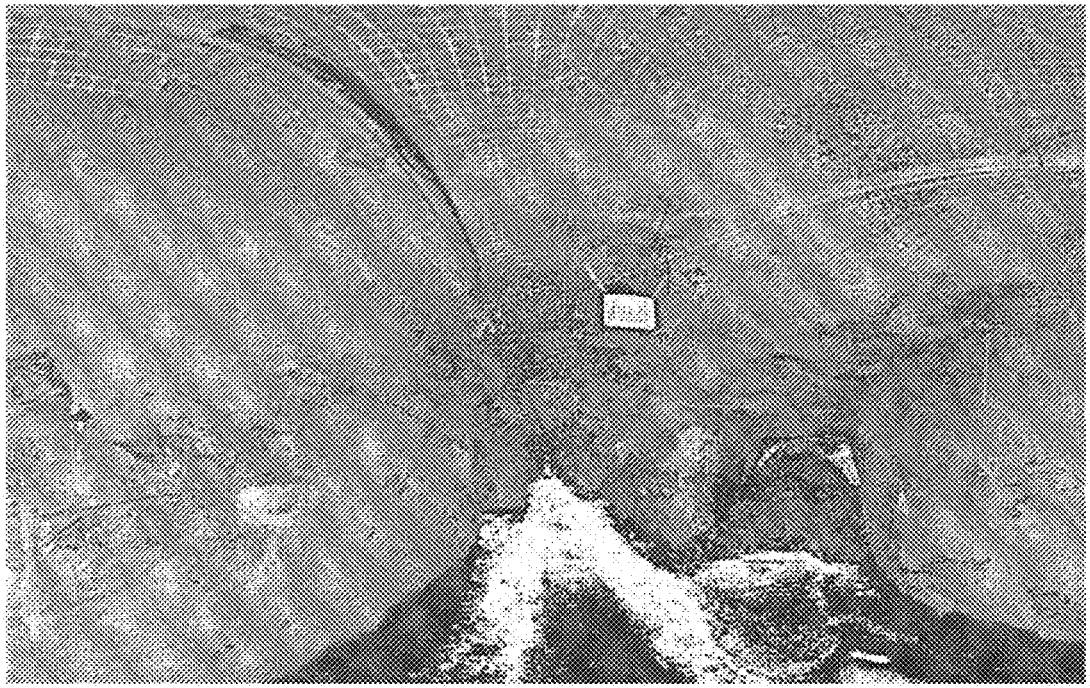
FIG. 10 shows the non-voxelised raw point cloud image taken from a second real point of view of the same scene as FIG. 9 at a later time.

FIG. 10 shows the non-voxelised raw point cloud image taken from a second real point of view of the same scene at a later time (next day).

Figure 11:
FIG. 11 shows the data of FIG. 9 voxelised based on the first real point of view.

FIG. 11 shows the data of FIG. 8 voxelised based on the first real point of view. In this example, the projection is nominated to be the Common Point of View that subsequent scans will be transformed and compared with to derive deformation information.

Figure 12:
FIG. 12 shows the data of FIG. 10 voxelised based on the common point of view.

FIG. 12 shows the data of FIG. 9 voxelised based on the common point of view, which in this case is the same as the first real point of view plus occlusion errors. The dark occlusions on the corner of the image and adjacent to objects such as the sign are example errors where the data from the current scan does not exist in the common virtual point of view.

Figure 13:
FIG. 13 shows a deformation heat map as if viewed from the common point of view.

FIG. 13 shows a deformation heat map as if viewed from the common point of view. The magnitude of the deformation is displayed in a hot cold colour pallet heat map. In this example, the yellow to red colour map depicts the magnitude of the detected deformation movement from 2.0 mm to 5.0 mm respectively.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A slope monitoring system that monitors deformation of a wall or slope from a virtual point of view comprising:
   a slope monitoring device that directs signals at a slope or wall and compiles a point cloud of direction data, range data and amplitude data from signals reflected from the slope or wall; and
   at least one processor that performs the steps of:
   (a) acquiring first direction data and first range data received from a first point cloud compiled by the slope monitoring device when in a first position having a first real point of view;
   (b) acquiring second direction data and second range data received from a second point cloud compiled by the slope monitoring device when in a second position having a second real point of view;
   (c) transforming the first direction data and first range data from the first real point of view and the second direction data and second range data from the second real point of view to virtual direction data and virtual range data having a virtual point of view by:

(i) rigid registration wherein the size and shape of the point cloud and distance between points in the point cloud are preserved; or (ii) non-rigid registration wherein the size and shape of the point cloud and distance between points in the point cloud are not preserved;

(d) segmenting the transformed data into blocks of data defining a voxel; and (e) comparing voxel range values over time to identify movement;

wherein the step of transforming the direction data and range data is according to a transform model in which:

$$T(A_p) = B_p \cdot E_{rr}$$

where $A_p$ is a set of points recorded from location A, $B_p$ is a set of points recorded from location B, and $E_{rr}$ is an error function derived using the Euclidean distance function:

$$\text{Dist}(T(Ap)(Bp)) = \sum_{a \in T(Ap)} \sum_{b \in Bp} (a-b)^2.$$

2. The slope monitoring system of claim 1 wherein the slope monitoring device is a slope stability radar or a slope stability lidar.

3. The slope monitoring system of claim 1 wherein the first position is displaced from the second position in any one or more of x-translation, y-translation, z-translation, pitch, yaw, roll.

4. The slope monitoring system of claim 1 wherein the virtual point of view is the first real point of view from the first position or is the second real point of view from the second position.

5. The slope monitoring system of claim 1 further comprising a mobile platform mounting the slope monitoring device.

6. The slope monitoring system of claim 1 wherein the step of transforming the direction data and range data is by rigid registration.

7. The slope monitoring system of claim 1 wherein the step of transforming the direction data and range data is by non-rigid registration.

8. The slope monitoring system of claim 1 wherein the step of transforming the direction data and range data is by a permutation of rigid registration and/or non-rigid registration.

9. The slope monitoring system of claim 1 wherein steps (a), (b), (c), (d) and (e) occur sequentially.

10. The slope monitoring system of claim 1 wherein steps (a) and (d) occur concurrently with steps (b) and (d) followed by step (c) and (e).

11. The slope monitoring system of claim 1 wherein the at least one processor performs the further steps of:

(f) acquiring subsequent direction data and subsequent range data received from a subsequent point cloud compiled by the slope monitoring device when in a subsequent position having a subsequent real point of view;

(g) transforming the subsequent direction data and subsequent range data from the subsequent real point of view to virtual direction data and virtual range data having the virtual point of view.

12. A method of monitoring deformation of a wall or slope from a virtual point of view comprising:

(a) acquiring first direction data and first range data received from a first point cloud compiled by the slope monitoring device when in a first position having a first real point of view;

(b) acquiring second direction data and second range data received from a second point cloud compiled by the slope monitoring device when in a second position having a second real point of view;

(c) transforming the first direction data and first range data from the first real point of view and the second direction data and second range data from the second real point of view to virtual direction data and virtual range data having a virtual point of view by:

(i) rigid registration wherein the size and shape of the point cloud and distance between points in the point cloud are preserved; or (ii) non-rigid registration wherein the size and shape of the point cloud and distance between points in the point cloud are not preserved;

(d) segmenting the transformed data into blocks of data defining a voxel; and (e) comparing voxel range values over time to identify movement;

wherein the step of transforming the direction data and range data is according to a transform model in which:

$$T(A_p) = B_p \cdot E_{rr}$$

where $A_p$ is a set of points recorded from location A, $B_p$ is a set of points recorded from location B, and $E_{rr}$ is an error function derived using the Euclidean distance function:

$$\text{Dist}(T(Ap)(Bp)) = \sum_{a \in T(Ap)} \sum_{b \in Bp} (a-b)^2.$$

13. The method of claim 12 wherein the step of segmenting is performed on the first direction data and second direction data before the step of transforming the direction data and range data.

14. The method of claim 12 wherein the step of segmenting is performed on the virtual direction data and second direction data after the step of transforming the direction data and range data.

* * * * *